United States Patent [19]

Tuomaala

[11] 4,308,461
[45] Dec. 29, 1981

[54] METHOD AND APPARATUS FOR MEASURING TIMBER

[75] Inventor: Jorma Tuomaala, Karhula, Finland

[73] Assignee: A. Ahlstrom Osakeyhtio, Noormarkku, Finland

[21] Appl. No.: 106,536

[22] Filed: Dec. 26, 1979

Related U.S. Application Data

[63] Continuation-in-part of Ser. No. 946,597, Sep. 28, 1978, abandoned.

[30] Foreign Application Priority Data

Oct. 20, 1977 [FI] Finland .................................. 773108

[51] Int. Cl.³ ............................................ G01N 21/86
[52] U.S. Cl. ................................. 250/561; 250/226
[58] Field of Search ................ 250/560, 226, 561; 144/312; 356/379, 380, 383, 384, 385, 386, 387

[56] References Cited

U.S. PATENT DOCUMENTS 3,886,372  5/1975  Sanglert ........................... 250/571

Primary Examiner—David C. Nelms
Assistant Examiner—Darwin R. Hostetter
Attorney, Agent, or Firm—Bucknam and Archer

[57] ABSTRACT

A method and an apparatus for determining the location of a piece of timber having a flat top surface and two unfinished side surfaces or determining the width and location of its flat top surface is described. The piece of timber is subjected to radiation in such a manner that the top surfaces and the side surfaces are simultaneously subjected to radiation of different wave length. Light may be used as the source of radiation and rays of different wave length are reflected from the piece of timber and are separately detected by means of a light sensitive element.

7 Claims, 3 Drawing Figures

METHOD AND APPARATUS FOR MEASURING TIMBER

This application is a continuation-in-part of U.S. Ser. No. 946,597 filed Sept. 28, 1978, now abandoned.

The present invention relates to a method and an apparatus for determining the location of a piece of timber having substantially flat top and bottom surfaces and two unfinished side surfaces and/or for determining the width and location of its flat top surface.

In U.S. Pat. No. 3,886,372 a method and an apparatus have been described to determine the width of an unfinished board. According to this method, the board is alternately illuminated from two opposite directions so that the light falling on the board from one side can illuminate the top surface and the side surface closer to the source of light whereas the other side surface is shadowed by the top surface. In this manner, a clear border line is defined between the top surface and the unfinished side in question.

One object of the present invention is to provide a method which is faster than the previously known method to determine the width and location of a piece of timber, e.g. of a board having two unfinished sides.

The crux of the present invention resides in subjecting the piece of timber to radiation in such a manner that different radiation is emitted from the two opposite sides of the timber. The radiation reflected from the two sides of the board is detected by radiation sensitive means. The method is particularly intended to be used in saw mills to determine the width of the finished surfaces of cants and unedged boards. As a source of radiation, it is possible to use light, heat or ultraviolet radiation.

According to one embodiment of the invention, the piece of timber is subjected to light of different wave length on the two opposite sides of the timber, so that light of different wave length is reflected from the board by radiation sensitive means. According to this embodiment, the two sides of the timber are subjected to light of different wave length in such a manner that rays of different wave length are reflected from the surfaces of the piece of timber, filtered, separated from each other and separately detected. In accordance with this embodiment, the two sides of the timber are simultaneously illuminated so that a substantial saving in time is achieved.

According to another embodiment of the invention, only one light source is used, and the light rays are filtered and reflected in such a manner that the light is split into visible light rays and infrared rays. The rays of visible light are reflected by a mirror onto one side surface of the board and the infrared rays are directed by means of mirrors onto the other side surface of the timber. The rays reflected from the two surfaces are then filtered by a filter consisting of two halves one of which allows only rays of visible light to go through and the other half allows only infrared rays. The rays are then detected by a light sensitive element.

The invention is illustrated by reference to the accompanying drawings of which

Figure 1:
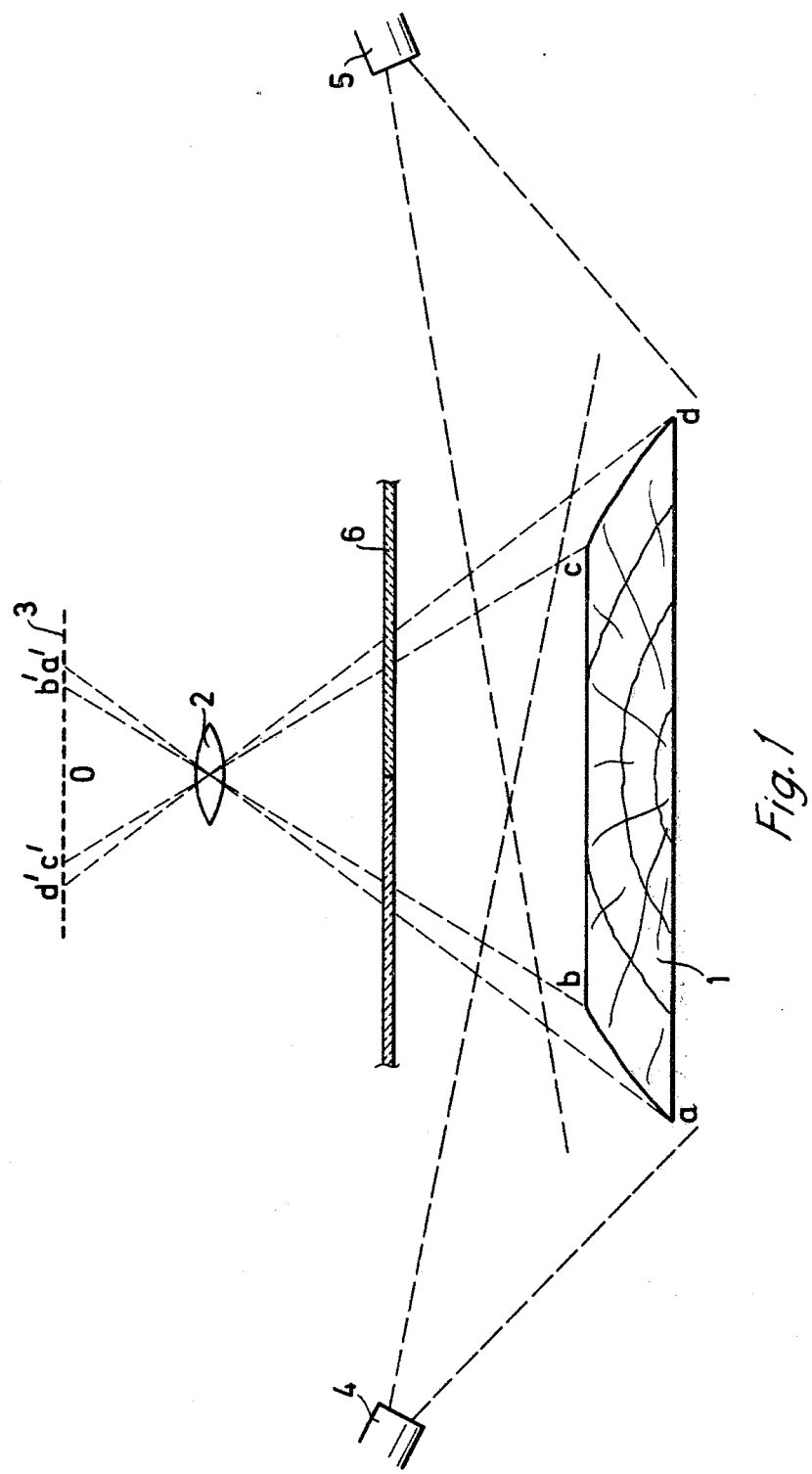
FIG. 1 illustrates the first embodiment of the invention, according to which light of different wave length is simultaneously directed on the two opposite sides of the timber.

By reference to FIG. 1, a typical cross-section of an unfinished board 1 has been marked a-b-c-d the letters indicating the corner points. The object is to program a computer to find the width and location of an edge-trimmed optimum board using the loaction of these points of the figure. Information denoting the location of points b and c is sufficient for this purpose. The data can be converted into a more suitable form by reflecting the surface b-c with a lens 2 onto a surface 3 of a diode. From surface 3 the data can be read as separate light intensity readings divided even into hundreds of measuring points. Two sources of light 4, 5 are mounted on the two sides of the board, with the light emitted from the two sources falling on the board obliquely from above. Lighting fixture 4 emits green light and lighting fixture 5 red light. Both sources of light operate simultaneously. A filter 6 divided into different colours from the middle is mounted between the lens and the board, in which filter the side closer to the red lamp is green and the side closer to the green lamp is red. Now the diode detects the light in section o-c' as green and the light in section o-b' as red. In section d'-c' the diode surface can only detect light as green due to the filter but the corresponding section d-c of the board is illuminated with red light, which cannot penetrate the green filter. Correspondingly, the light cannot enter section b'-a' and only section c'-b' is detected. Filters and the colours of light cannot be made absolutely monocromatic and non-penetrable by other light. This feature can be utilized so that sections d'-c' and b'-a' can be registered as well but their multiple weaker light intensity distinguishes them clearly from section c'-b'.

Figure 2:
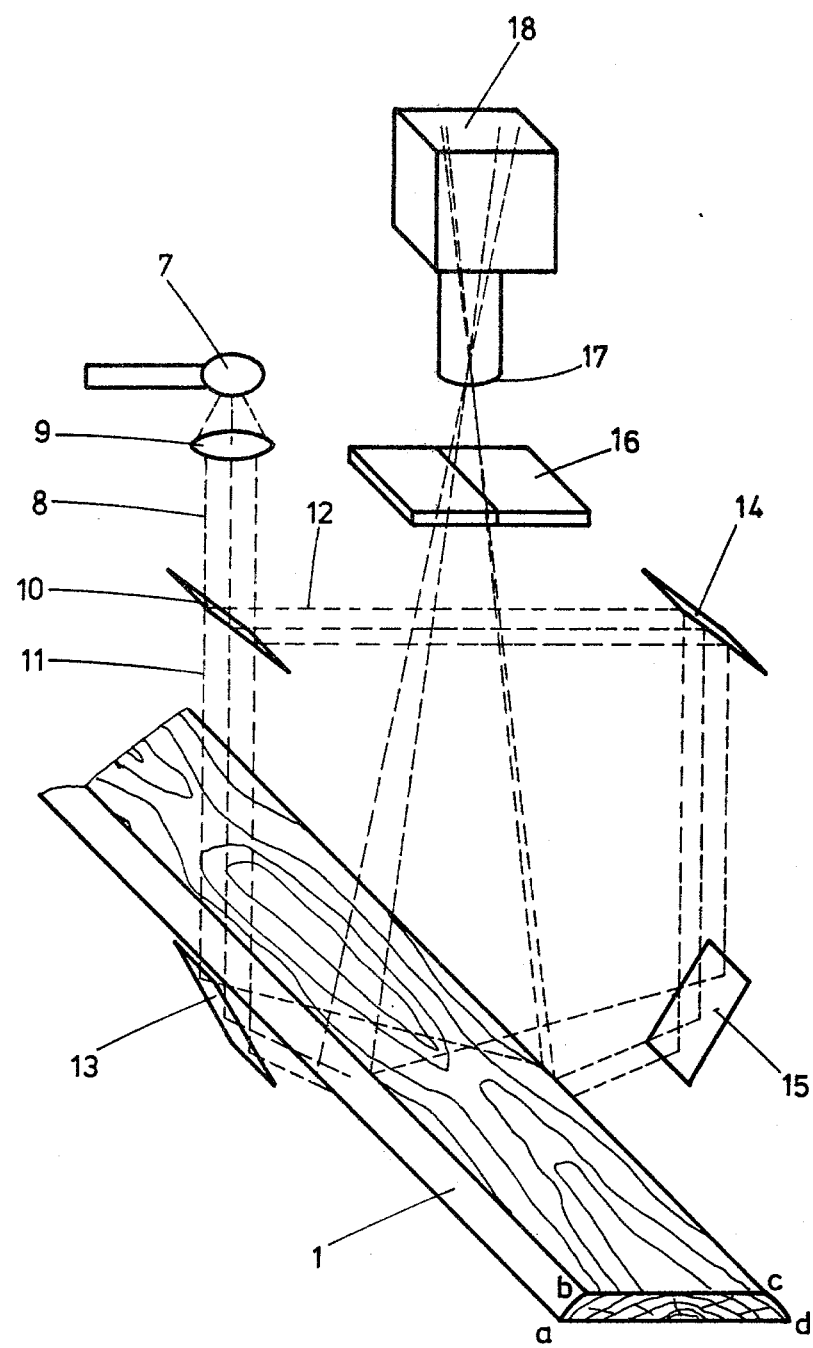
FIGS. 2 and 3 illustrates the embodiment according to which only one light source is used, which is split into visible light and infrared rays and the two sides of the timber are subjected simultaneously one to visible light and the other to infrared rays.

In FIG. 2 a source of light 7 positioned above the board 1 emits light rays which are collected to a beam of parallel rays of light 8 by focusing lens 9. The rays 8 are filtered and reflected by a filtering and reflecting means 10 in such a way that visible light rays 11 are passed through a filter-reflector 10 while infrared rays 12 are reflected. The rays 11 which pass the filter-reflector are reflected by mirror 13 onto the surface a-b of the board. The infrared rays 12 which are reflected by the filter-reflector are directed towards the surface c-d by means of mirrors 14 and 15. Rays reflected from the surfaces a-b and c-d are filtered by filter 16, consisting of two halves, one of which allows visible light rays to pass and the other infrared rays. Rays passing the filter 16 are collected by lens 17 and detected by light sensitive element 18. The latter is analogous to diode 3 in FIG. 1.

Figure 3:
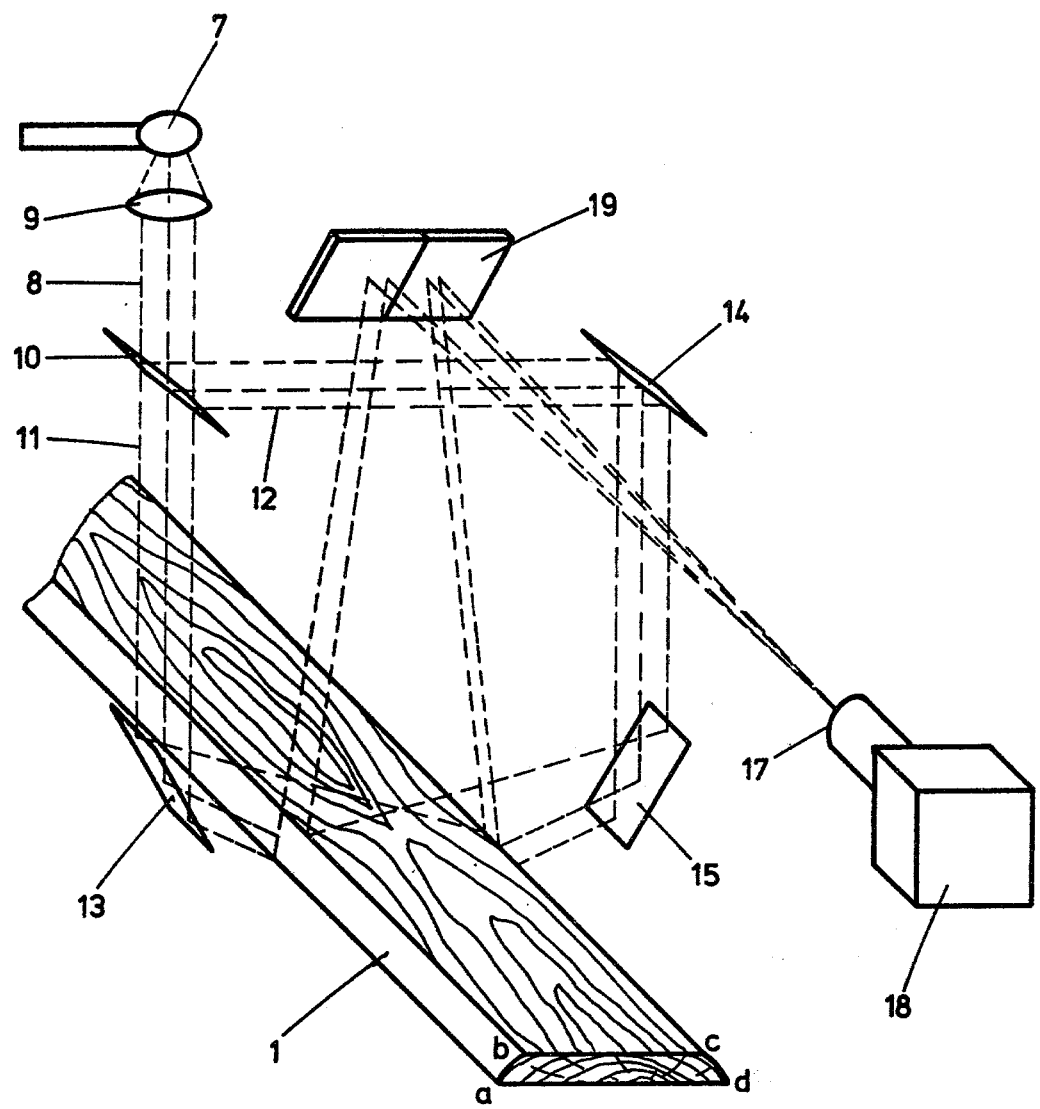

In FIG. 3 equivalent elements are indicated by the same reference numbers. Rays reflected from the surfaces a-b and c-d are reflected by mirror 19 towards lens 17 which collects them on a light sensitive element 18. The mirror consists of two halves, one of which reflects only visible light rays and the other only infrared rays.

The filtering and reflecting means 10 and filter 16 and mirror 19 are made of glass and covered by a dielectric material.

Within the scope of the invention lights of different wave length may be obtained by means of polarization or pulsation. When frequency separation of pulsating lights of different frequencies is used, the filter is electronic. Alternatively, some other type of radiation eg. heat of ultra violet radiation, may be used. Cameras may be used as light-ray detectors. The light rays may be directed onto light sensitive elements through an apertured board or pipes.

The method according to the invention may be applied either by making the board move past the lighting fixture or vice versa.

What is claimed is:

1. A method of determining the location of a piece of timber having substantially flat top and bottom surfaces and two unfinished side surfaces and/or of determining the width and location of its flat top surface, which consists of subjecting said two unfinished sides of said piece of timber simultaneously to radiation, in such a manner that the radiation on the two unfinished sides is of different wave length, and the rays of different wave length reflected from the two surfaces of the piece of timber are filtered and then separated from each other and detected separately.

2. The method according to claim 1 wherein the radiation is light, the piece of timber is illuminated simultaneously with green light from one side and with red light from the other, and the green and red lights are detected separately.

3. The method according to claim 1 wherein the radiation is a single light source, the light is filtered and reflected to let visible light rays go through and to reflect infrared rays, causing the rays of visible light to be reflected onto one of said unfinished sides, causing the infrared rays to be reflected onto the other of said two unfinished sides.

4. An apparatus for determining the location of a piece of timber having substantially flat top and bottom surfaces and two unfinished side surfaces and determining the width and location of its flat top surface, which comprises at least one source of radiation, means for directing rays of different wave length from said at least one source of radiation onto the top surface and one side of said piece of timber, means for filtering said rays, means for separating the two rays of different wave length reflected from the two side surfaces of the piece of timber and filtered and means for detecting the reflected and filtered rays.

5. The apparatus according to claim 4 which comprises two sources of light mounted on the two sides of the piece of timber of which one emits green and the other red light, a color filter mounted above the piece of timber, one half of which is penetrable by green and the other by red light, a light sensitive element, and means for directing reflected light rays onto the light sensitive element.

6. The apparatus according to claim 4 which comprises a single source of light, first filtering and reflecting means to let visible light rays pass through and to reflect the infrared rays, mirror means to reflect said visible light rays onto one of said unfinished sides of the timber, mirror means for directing said infrared rays onto the other of said two unfinished sides, second filtering means for said visible light rays and said infrared rays and means for separately detecting said visible light rays and said infrared rays.

7. The apparatus according to claim 6 wherein said first filtering and reflecting means and said second filtering means are made of glass coated with a dielectric material.

* * * * *